United States Patent [19]

Ostermeyer

[11] Patent Number: 4,721,431
[45] Date of Patent: Jan. 26, 1988

[54] SELF LOADING SYSTEM

[76] Inventor: Bernd Ostermeyer, Stuart Hwy., Berrimah, Northern Territory, Australia, 5788

[21] Appl. No.: 787,799

[22] PCT Filed: Feb. 5, 1985

[86] PCT No.: PCT/AU85/00017
§ 371 Date: Oct. 30, 1985
§ 102(e) Date: Oct. 30, 1985

[87] PCT Pub. No.: WO85/03481
PCT Pub. Date: Aug. 15, 1985

[30] Foreign Application Priority Data

Feb. 6, 1984 [AU] Australia ................ PG3484

[51] Int. Cl.⁴ .............................................. B60P 1/54
[52] U.S. Cl. ...................................... 414/542; 212/73
[58] Field of Search ............... 414/542, 544, 345, 348; 212/73, 125

[56] References Cited

U.S. PATENT DOCUMENTS

| 2,437,806 | 3/1948 | Dempster | 414/544 |
| 3,586,183 | 6/1971 | Shaffer | 414/544 |
| 4,219,122 | 8/1980 | Blatchford | 414/542 X |
| 4,385,861 | 5/1983 | Blatchford | 414/542 |
| 4,518,304 | 5/1985 | Blatchford | 414/542 |

FOREIGN PATENT DOCUMENTS

| 1922343 | 11/1970 | Fed. Rep. of Germany | 414/542 |
| 1277001 | 6/1972 | United Kingdom | 414/542 |

Primary Examiner—Robert J. Spar
Assistant Examiner—Stuart J. Millman

[57] ABSTRACT

The loading and unloading of large items such as shipping containers from vehicles is accomplished with a lifting and transferring unit at each end of the vehicle. Each unit has a lifting post (3) slidable on a transverse track (7), and a foldable track extension (12) to extend the track (7) laterally of the vehicle. Hydraulic rams (5,6) swing the track to its extended position and locate the lifting post in its position. A hydraulic ram (4) lifts the container (1) by lifting chains (17).

3 Claims, 11 Drawing Figures

FIG. 7

SELF LOADING SYSTEM

This invention relates to a self loading system that can be fitted to truck bodies, trailers, semi-trailers or special trailers to load or unload heavy items such as containers, crates, bins, machinery, motor generating sets or the like.

Usually in the loading of large items such as mentioned above onto truck bodies, semi-trailers or the like, special cranes are provided which are necessary to be brought to the site for the loading operation.

It is an object of this invention to provide a fully self-contained system which is mounted on the vehicle so that large items such as containers can be loaded onto the trailer or vehicle and unloaded therefrom as desired without the requirement for any additional crane or loading apparatus.

Thus there is provided according to the invention a self-contained apparatus for a transport vehicle, the system comprising lifting means mounted on the transport vehicle at each end of the container or goods to be loaded, each lifting means comprising a lifting post adapted to move transverse of the vehicle on a guide track, means to extend the guide track from the side of the vehicle, means to move the lifting post to a central position of the container or goods to be lifted, means attaching the lifting post to the goods or container, and means to move the lifting post together with the goods or container onto the guide track extension, at which point the goods or container can be lowered to the ground.

In order to more fully describe the invention reference will now be made to the accompanying drawings in which.

As shown in the drawings, a container 1 is shown on a truck body or trailer. The apparatus as shown in FIGS. 5 to 11 of the drawings is from the rear of the vehicle, and it will be realised that a similar apparatus is located at the front of the vehicle to lift and control the front of the container. The apparatus has a base 2 which is mounted and bolted to the truck or trailer deck to a strengthening member or column beneath the deck and is welded into position through the truck or trailer chassis beams.

The apparatus includes a telescopic lifting post 3 which is controlled by a lifting post ram 4, the post being adapted to be moved transversely of the vehicle by hydraulic rams 5 and 6, the post sliding in a track 7.

Figure 1:
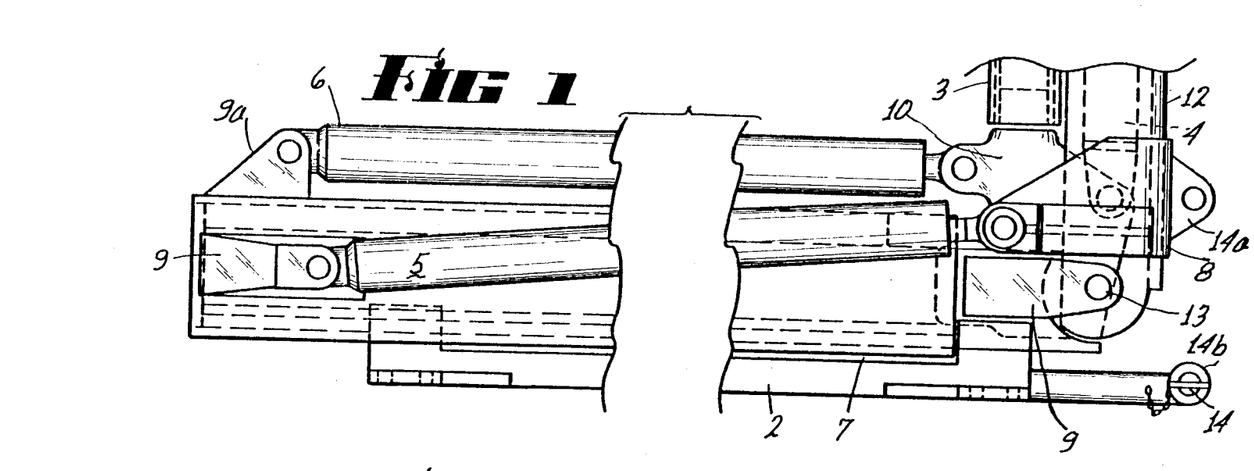
FIG. 1 is a partial side elevation of one of the units.
Figure 2:
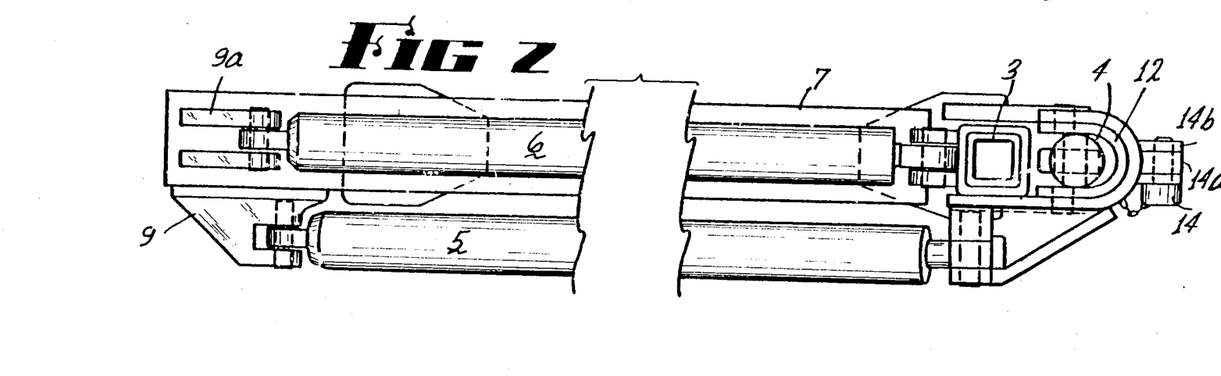
FIG. 2 is partial plan thereof.
Figure 3:
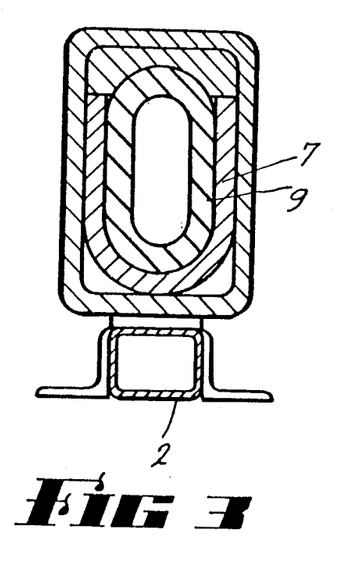
FIG. 3 is a cross-section of part of the unit.
Figure 4:
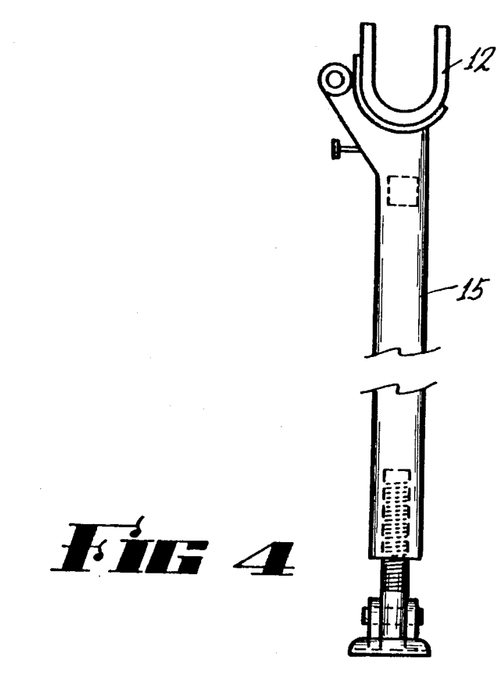
FIG. 4 is an end view of the supporting leg.
Figure 5:
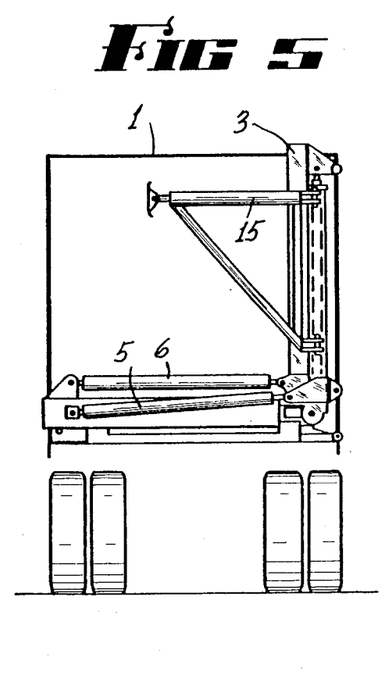
FIGS. 5 to 10 show a sequence of unloading.
Figure 6:
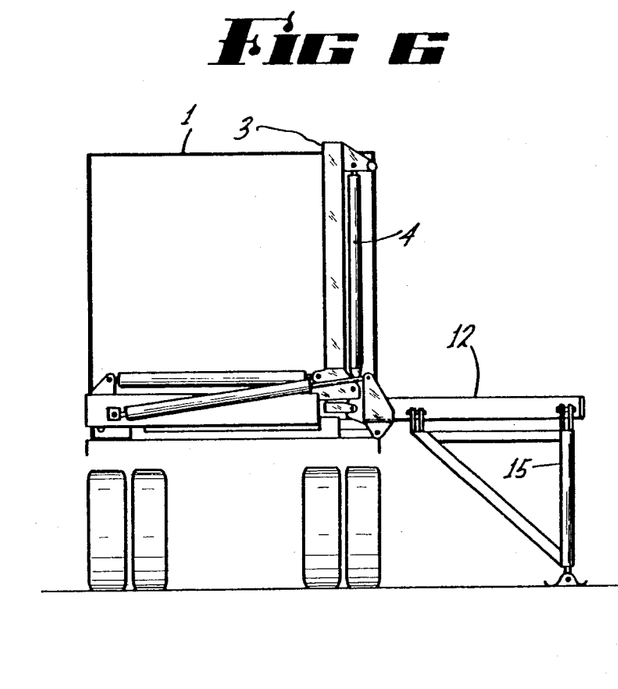
Figure 7:
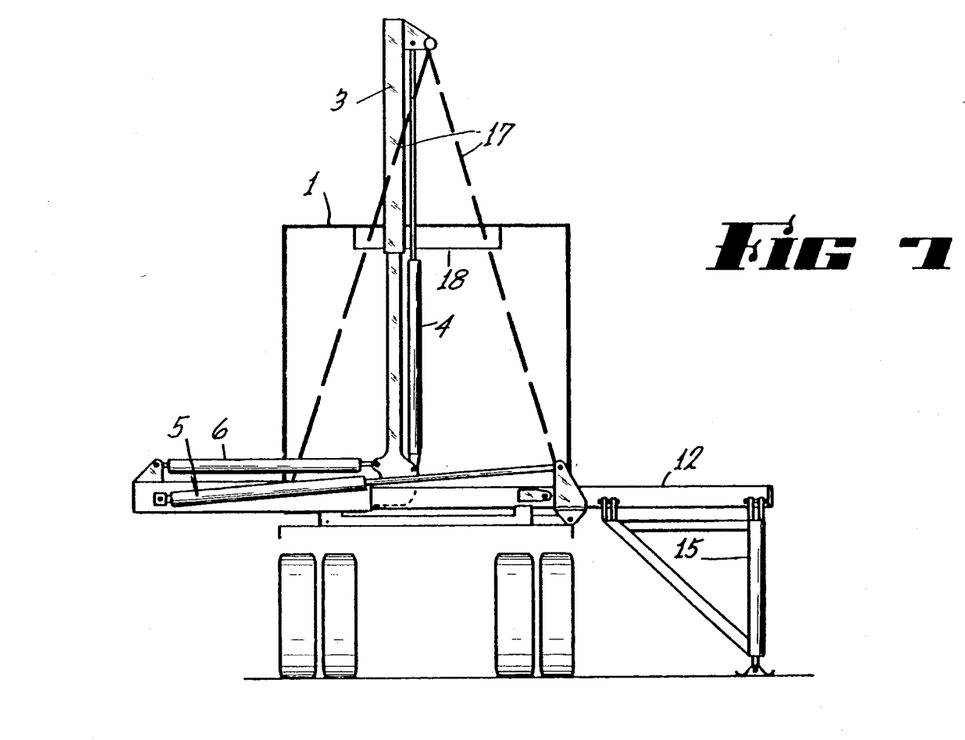

The ram 5 is connected to a bracket 8 mounted on a pivoted track extension 12 pivoted by a pivot 13 to a slide 9, the bracket 8 being adapted to be locked by a locking pin 14 to the base 2 through bosses 14a and 14b. It will be seen that actuation of the ram initially pivots the track extension 12 from an upright position as shown in FIG. 1 to a horizontal position shown in FIGS. 6 to 11.

The other end of the ram 5 is connected to the slide 9 adapted to slide on the base on the track 7, with the ram 6 being connected between a bracket 9a on the slide 9 and a support 10 for the lifting post.

The track extension 12 has pivoted thereto a stabilising leg 15 which when the track extension is lowered, is adapted to be swung downwardly so that its adjustable foot is adapted to rest on the ground.

After the track extension has been lowered and locked in position by locking pins, the ram 5 is again actuated to move the lifting post to the centre of the vehicle or the centre of the container to be lifted, the rams 5, 6 and slide 9 sliding in the track 7.

Lifting chains 17 are then attached to the lower ends of the container, these passing over a support pad 18 at the top of the container 1. The lifting post ram 4 is extended and the chain lengths 17 are so adjusted that there is still sufficient extension of the lifting post ram 4 to lift the container 1 from the vehicle, and later to lower the container 1 onto the ground as later described.

Figure 8:
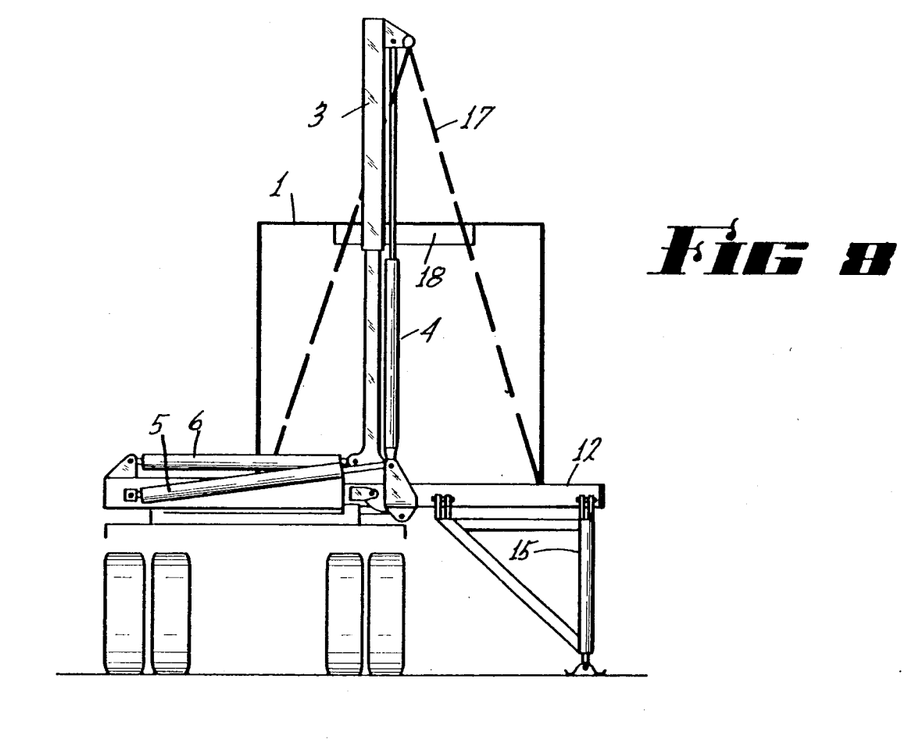
Figure 9:
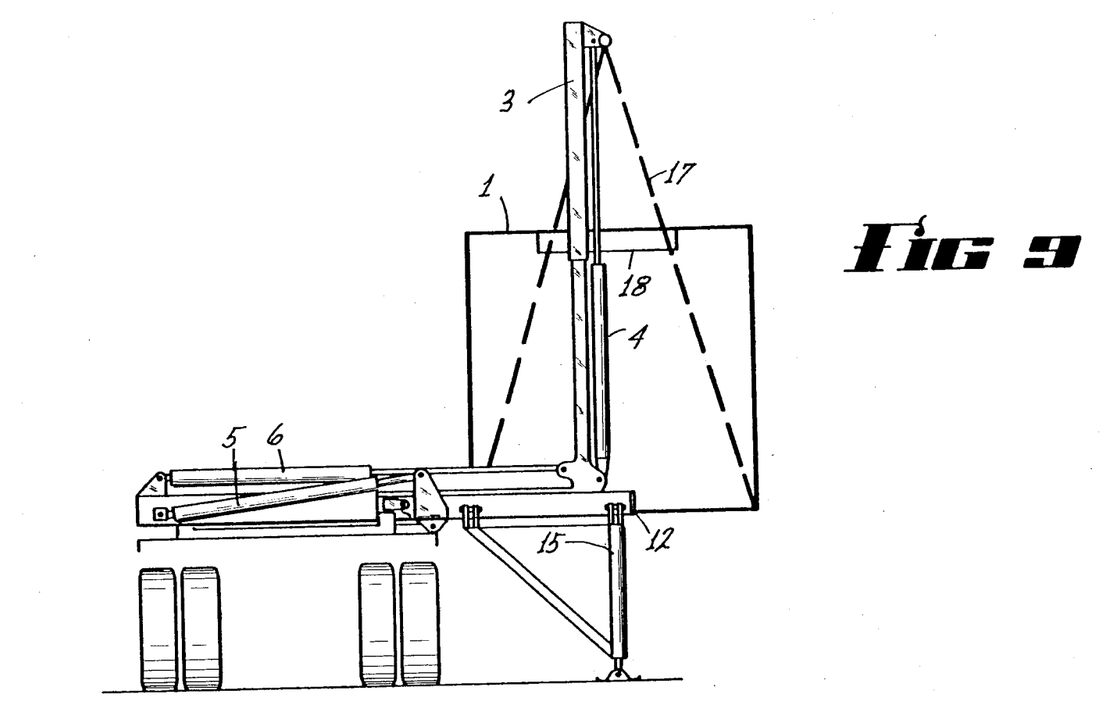
Figure 10:
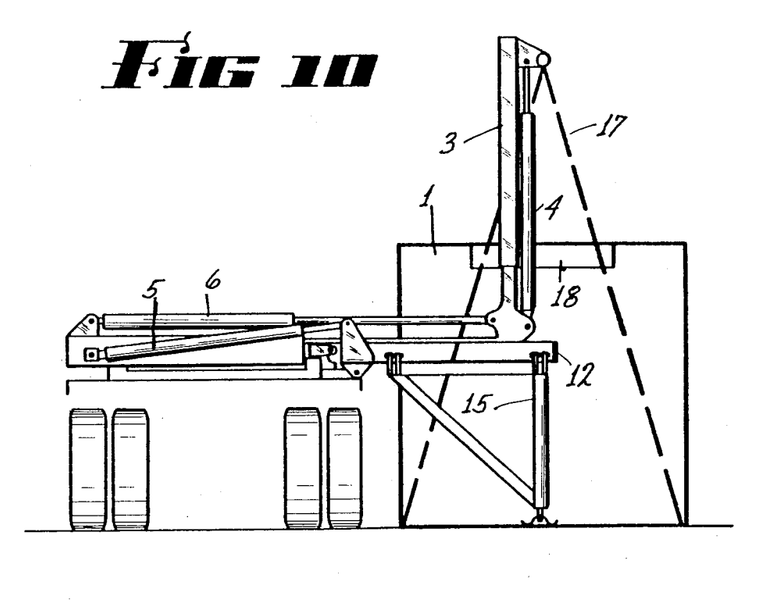

Referring to FIG. 8 it will be seen that the ram 5 has now been retracted thus moving the container 1 partially off the vehicle and onto the track extension 12 at which time the ram 6 is actuated to move the container 1 clear of the vehicle at which time the lifting post ram 4 is retracted to lower the container 1 onto the ground.

It will be seen that by a reverse operation that the container can be lifted and placed in position on the vehicle.

Figure 11:
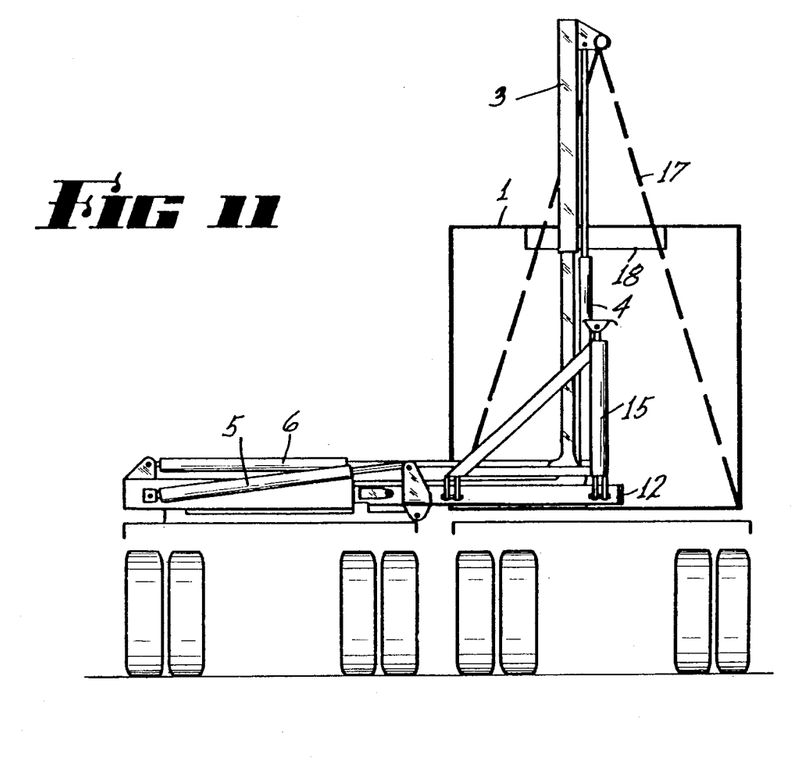
FIG. 11 shows the transfer to another vehicle.

Also the invention can be utilised for transferring a container from one vehicle to the other as shown in FIG. 11, in which case the track extension 12 is extended across the other vehicle which is positioned as close as possible to the first vehicle, but the stabiliser legs 15 are not lowered but remain in their vertical position, the track extension 12 extending across over the bed of the adjacent vehicle and being supported thereby.

It is desired that the various components of the track extension and slide and bracket members could be formed of aluminum, the slides being formed of an aluminum extrusion while the brackets and the like can be of cast aluminum, thus reducing the weight and also producing long life with little or no corrosion, the extrusions having sufficient tolerances for the track extension and guide and slide members to be produced without any other manufacturing or finishing action to be taken on the aluminum extrusions.

It will be seen that in the transport position that the whole unit is mounted within the confines of the width of the vehicle and the height of the vehicle, and by having the post on one side for transport purposes and then moving the post to the centre for initial lifting and positioning of the container on the vehicle a compact unit is produced which can remain on the vehicle as desired.

The spacing between the two units along the vehicle can be as desired, for example the length of a container to be shifted.

The container can thus be loaded and unloaded from a vehicle by a single person, the hydraulic power being supplied either by the engine of the vehicle, or a small separate combustion engine driving a hydraulic pump mounted on the trailer or vehicle as desired.

This system can also be utilised for the side tipping operation with bins incorporating a top hinged side door, for loading and unloading of heavy cable drums, machinery, generator sets, where normally a separate heavy mobile crane would be required.

Although the invention has been described in some detail it is to be realised that the invention is not to be limited to the specific details described but can include various modifications falling within the spirit and scope of the invention.

I claim:

1. A self-contained loading apparatus for a transport vehicle, the apparatus comprising lifting means mounted on the transport vehicle at each end of a container or goods to be loaded, each lifting means comprising a lifting post adapted to move transverse of the vehicle on a guide track, a guide track extension to extend the guide track from the side of the vehicle, a stabilizing leg pivoted to said guide track extension to engage the ground, means to move the lifting post to a central position of the container or goods to be lifted, means attaching the lifting post to the goods or container onto the guide track entension, at which point the goods or container can be lowered to the ground, each lifting post being mounted on a slide to slide in the guide track, the slide having mounted thereon one end of a hydraulic ram having its outer end connected to a bracket connected to the guide track extension and pivoted to the adjacent end of the guide track whereby actuation of the first hydraulic ram moves the track extension from an upright transport position to an extended position extending away from the transport vehicle, and locking means being provided to lock the track extension in this extended position.

2. A self-contained loading apparatus as defined in claim 1 wherein each slide includes a second ram mounted thereon and connected at its other end to the base of the lifting post, and further including a ram having one end attached to the base of the lifting post and its other end connected to the means attaching the other end of the ram to the container or goods to be lifted.

3. A self-contained loading apparatus for a transport vehicle, the apparatus comprising lifting means mounted on the transport vehicle at each end of a container or goods to be loaded, each lifting means comprising a lifting post adapted to move transverse of the vehicle on a guide track, a guide track extension to extend the guide track from the side of the vehicle, a stabilizing leg pivoted to said guide track extension to engage the ground, means to move the lifting post to a central position of the container or goods to be lifted, means attaching the lifting post to the goods or container onto the guide track extension, at which point the goods or container can be lowered to the ground, each lifting post having a base mounted on a slide slidable in the track, a lifting ram attached to said base and having at its other end said means to be attached to the container or goods, a first ram attached at one end to the slide and at the other end pivoted to a bracket attached to the track extension, and a second ram attached at one end of the slide and the other end to the base of the lifting post so that to remove the container or load from the vehicle, the first ram is operated to extend the track extension and locking means to lock the track extension in position, the first ram is then operated to move the lifting post and slide to the lifting position, the lifting ram is actuated to position the lifting means for attachment to the container or goods, the lifting ram is actuated to raise the container or goods from the vehicle, the first ram is actuated to move the lifting post sideways and the final movement is achieved by actuating the second ram to position the container or goods adjacent the side of the vehicle, and the lifting ram is operated to lower the container or goods onto the ground.

* * * * *